(12) United States Patent
Zhang et al.

(10) Patent No.: US 8,365,196 B2
(45) Date of Patent: Jan. 29, 2013

(54) METHOD AND DEVICE FOR LOG EVENTS PROCESSING

(75) Inventors: Jun Wei Zhang, Shanghai (CN); Jing Cai, Shanghai (CN); Hui Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1300 days.

(21) Appl. No.: 12/117,808

(22) Filed: May 9, 2008

(65) Prior Publication Data

US 2009/0106594 A1    Apr. 23, 2009

(30) Foreign Application Priority Data

Oct. 19, 2007   (CN) .......................... 2007 1 0180896

(51) Int. Cl.
*G06F 3/00* (2006.01)
(52) U.S. Cl. ....................................................... 719/318
(58) Field of Classification Search .................. 719/318; 714/799, 767
See application file for complete search history.

(56) References Cited

U.S. PATENT DOCUMENTS

| | | | |
|---|---|---|---|
| 3,582,880 A * | 6/1971 | Beausoleil et al. ............. | 714/54 |
| 5,121,475 A * | 6/1992 | Child et al. .................... | 715/201 |
| 6,601,188 B1 | 7/2003 | Wilding | |
| 6,996,844 B2 | 2/2006 | Langford et al. | |
| 7,089,455 B2 | 8/2006 | Ruhlen et al. | |
| 7,308,597 B2 * | 12/2007 | Bhat et al. ....................... | 714/4.2 |
| 2003/0167421 A1 * | 9/2003 | Klemm ........................... | 714/37 |
| 2004/0107387 A1 | 6/2004 | Larsson et al. | |
| 2004/0205421 A1 | 10/2004 | Glerum et al. | |
| 2006/0150008 A1 | 7/2006 | Srinivas et al. | |
| 2006/0294214 A1 * | 12/2006 | Chou ............................ | 709/223 |
| 2007/0143338 A1 * | 6/2007 | Wang et al. ............... | 707/103 R |

OTHER PUBLICATIONS

William N. Robinson, Implemeting Rule-based Monitors within a Framework for Continuous Requirements Monitoring, 2005.* (Chinese Translation).

* cited by examiner

*Primary Examiner* — Lechi Truong
(74) *Attorney, Agent, or Firm* — Yuanmin Cai

(57) ABSTRACT

The present invention relates to a method and device for log event processing. The method comprises the steps of: receiving a log event; determining whether or not the log event meets one or more predetermined conditions; and executing one or more processes determined according to the predetermined conditions when the log event meets the predetermined conditions. The method and device can execute, according to a log event, processes determined according to predetermined conditions on the premise of not changing existing software and hardware architectures.

6 Claims, 4 Drawing Sheets

METHOD AND DEVICE FOR LOG EVENTS PROCESSING

CROSS REFERENCE TO RELATED APPLICATION

Figure 1:
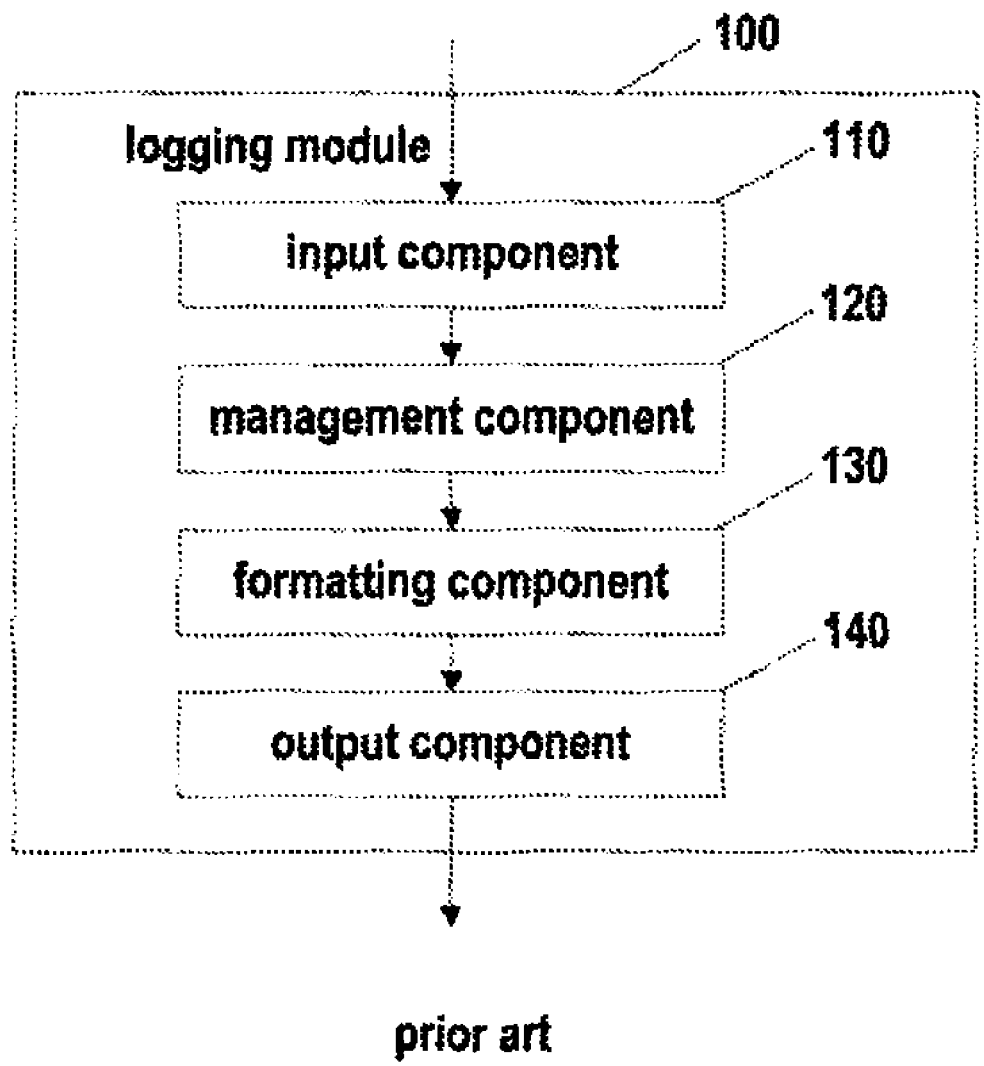

The present application claims the benefit of priority to a Chinese Patent Application Serial Number 200710180896.6, entitled "Method and Device for Log Events Processing", filed Oct. 19, 2007 with the State Intellectual Property Office (SIPO) of the People's Republic of China, the content of which is incorporated herein by reference in its entirety.

FIELD OF THE INVENTION

The present invention relates generally to the field of computer, and in particular to a method and device for log events processing.

BACKGROUND OF THE INVENTION

Nowadays, event model has become a fundamental part of many framework and infrastructure. Users often want to get real-time indications and automatic tracing of events when using event model-based applications. For example, when banking service users use management application products developed by Java and JLog, they might wish software providers to add real-time indications and automatic tracing of events to existing software products. However, it takes a relatively high cost to frequently add different processes by means of existing logging tools.

Existing logging tools (hereinafter referred to as logging modules) comprise, for example: (1) JLog (Logging Toolkit for Java), provided by IBM and having a variety of functions for logging and tracing. JLog can create detailed logs and debug files while working in the background; (2) Log4J, which is used for message logging, where the destination of the logged messages may be consoles, files, GUI components, socket servers, NT event recorders, UNIX Syslog daemon processes, etc., and users can control the output format of each log; and which can be flexible configured via a configuration file without modifying program code; (3) Huston and (4) Trace Log etc.

However, these logging modules usually have the following problems: but for logging, processes such as real-time indication and pre-defined operations, may be executed on log events inconveniently; the implementation of the log event capture and indication varies from system to system; when extra processes are needed, a lot of analysis and design work will be involved and hard-coded settings are needed in programs; and reuse is hard for users and maintainers.

SUMMARY OF THE INVENTION

In view of the problems described above, the present invention provides a method and device for executing corresponding processes determined according to predetermined conditions, based on the determination as to whether or not a log event meets the predetermined conditions.

It is an object of the present invention to execute, according to a log event, processes determined according to predetermined conditions on the premise of not changing existing software and hardware architectures.

According to a first aspect of the present invention, there is provided a method for log event processing, which comprises the steps of: receiving a log event; determining whether or not the log event meets one or more predetermined conditions; and executing one or more processes determined according to the predetermined conditions when the log event meets the predetermined conditions.

According to a second aspect of the present invention, there is provided a device for log event processing, which comprises: a reception unit operable to receive a log event; a determination unit operable to determine whether or not the log event meets one or more predetermined conditions; and an execution unit operable to execute one or more processes determined according to the predetermined conditions when the log event meets the predetermined conditions.

Advantages of the present invention include:
(1) the method and device of the present invention can be plugged into existing logging mechanisms conveniently and seamlessly in applications, and there is no need to modify existing program structures but some minor efforts need to be done to change the configuration, which saves considerable time and expense;
(2) users can define various processes by their own, which will be triggered automatically when particular events occur, so the whole procedure no longer needs manual intervention;
(3) the log information captured by the method and device of the present invention will be categorized and utilized sufficiently, which helps users easily get the event indication instantaneously;
(4) the method and device of the present invention can be used easily.

Other features and advantages of the present invention will become more apparent from the following detailed description of embodiments illustrating principles of the present invention, when taken in conjunction with the accompanying drawings.

BRIEF DESCRIPTION ON THE DRAWINGS

Figure 2:
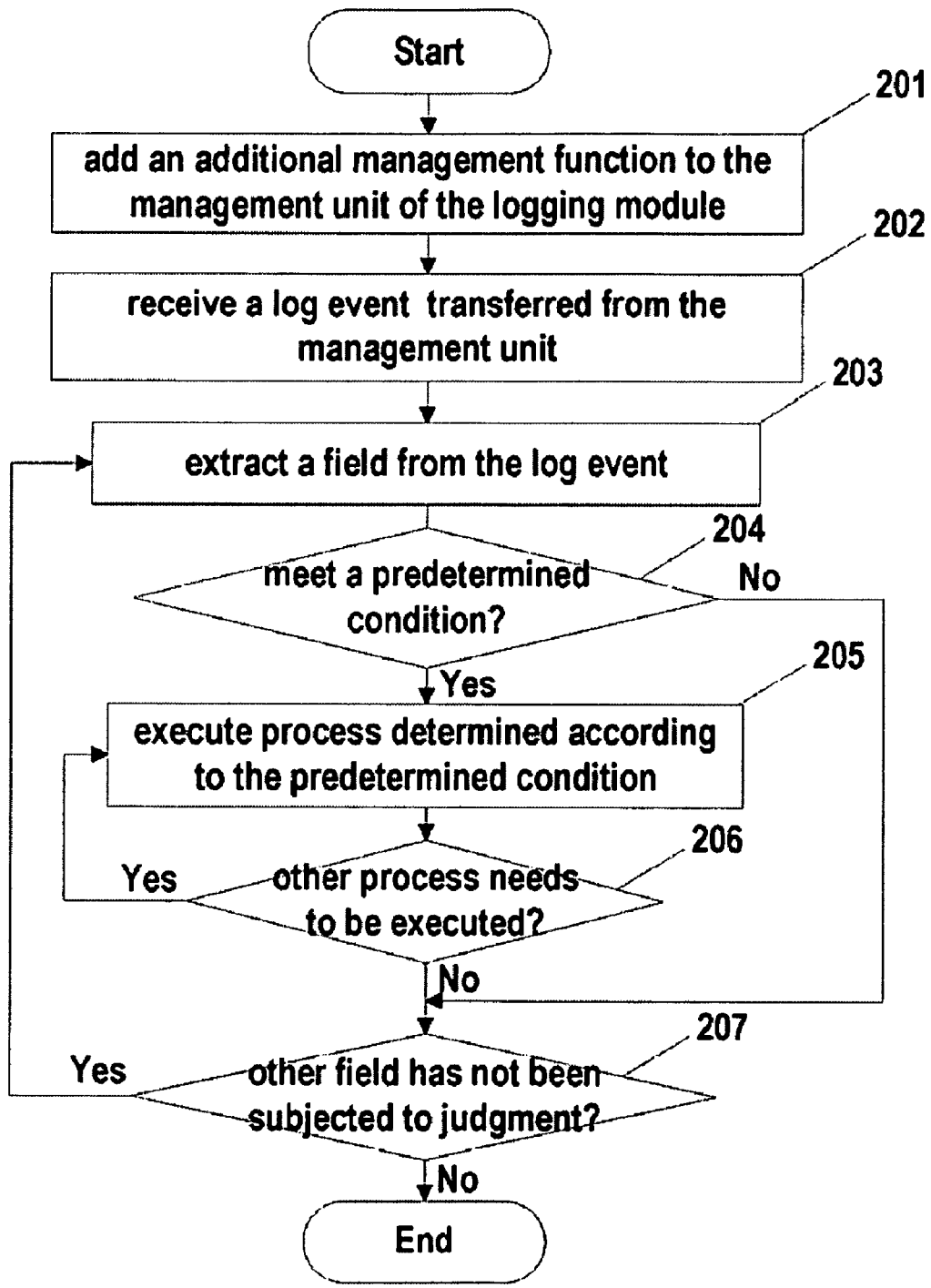
Figure 3:
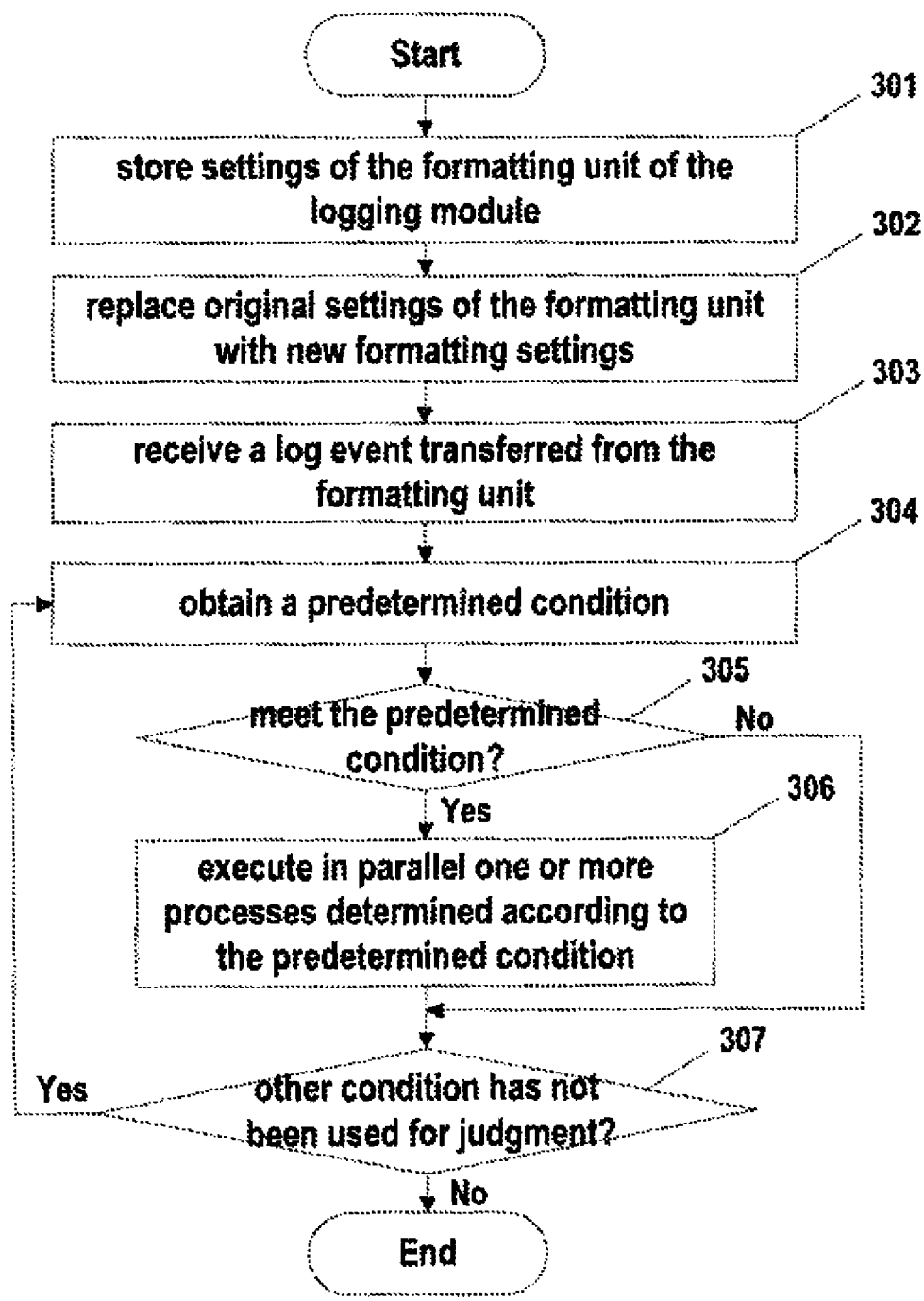
Figure 4:
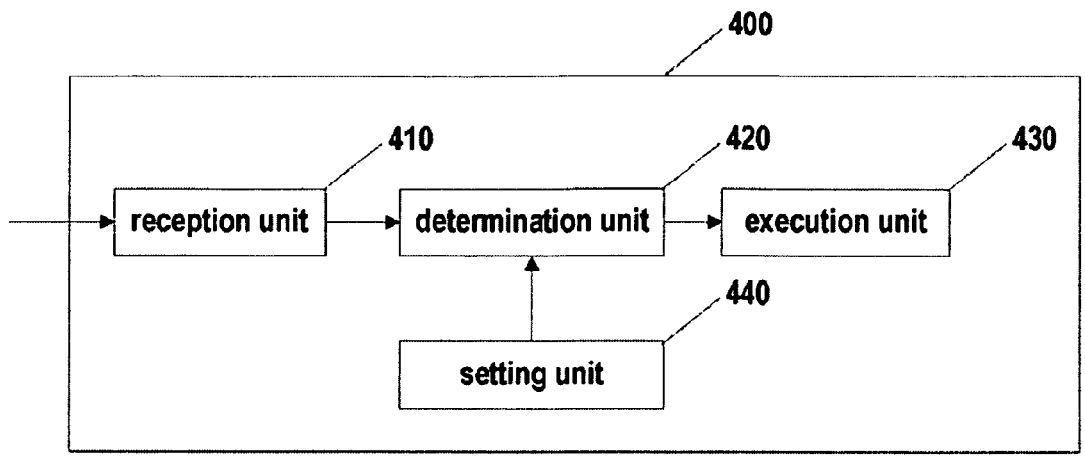
Figure 5:
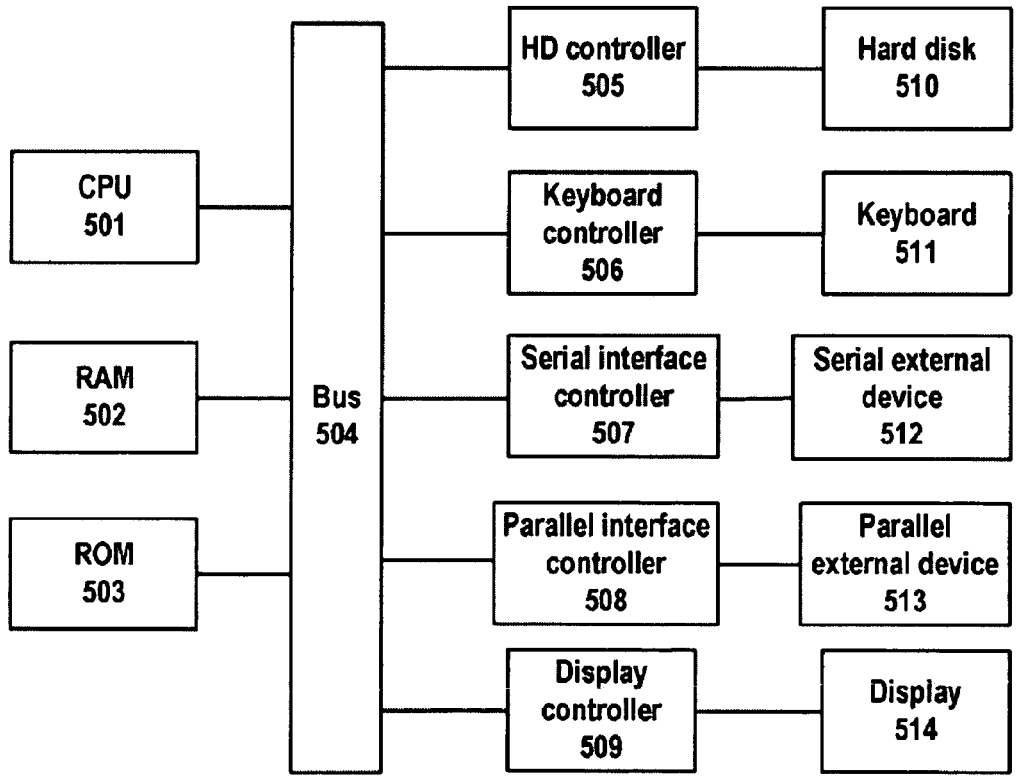

FIG. 1 is a schematic layout view of a logging module according to an embodiment of the present invention;
FIG. 2 is a flowchart of a method for log event processing according to an embodiment of the present invention;
FIG. 3 is a flowchart of a method for log event processing according to another embodiment of the present invention;
FIG. 4 is a block diagram of a device for log event processing according to another embodiment of the present invention; and
FIG. 5 is a block diagram showing a computer system suitable to implement the present invention.

DESCRIPTION OF THE PREFERRED EMBODIMENTS

Embodiments of the present invention will be described in detail.

In the terms used in the present invention, log events comprise information on security, communication, login and the like of systems, computer software and hardware. For example, log events may include fields such as log event ID, keyword, timestamp, log event level, log event body and log event name. Among them, the field of log event level may have levels from 1 to 4, for example. When the level of a log event is equal to the highest level, 1, it is indicated that the log event is of the highest importance; when the level of a log event is equal to 4, it is indicated that the log event is of the lowest importance. For example, the field of log event body may include a wide range of log contents, such as "abnormity occurs" and "parameter setting is modified" etc.

FIG. 1 is a schematic layout view of a logging module 100. Description will be given below in the context of an example of JLog. A logging module is a module that records each log event when an application is running. It is to be understood although description and explanation are given here in the context of an example of JLog as a logging module, JLog is not intended to limit a logging module of the present invention. For example, a logging module of the present invention can be Log4J, Huston, TraceLog, etc.

Logging module 100 (i.e. JLog) shown in FIG. 1 comprises an input component 110, a management component 120, a formatting component 130 and an output component 140. An operation flow of JLog is as follows:

An application invokes JLog for logging, and input component 110 receives a log event from the application and transfers it to management component 120;

Management component 120 has a wide range of functions including: extracting a log event, such as obtaining respective field of the log event; managing a log event, such as filtering or screening some fields of the log event; and the like. Additionally, management component 120 has an external interface via which additional functions can be added. When management component 120 receives a log event, its respective functions can be executed simultaneously or selectively by setting a configuration file of JLog.

Formatting component 130 formats a log event into a specific format. Users can define formatting settings by setting the configuration file of JLog, so that formatting component 130 can format a log event according to specific formatting settings. Formatting setting may include, for example, ranking fields contained in a log event, combining multiple fields into a new field, and the like. Formatting component 130 also has an external interface.

Output component 140 outputs the log event that has been formatted into a specific format. For example, output component 140 logs the event into a file, outputs it to a console, prints it as text or outputs it via a socket, so that users can view and use the log event.

FIG. 2 is a flowchart of a method for log event processing according to an embodiment of the present invention.

Before detailed description is given to an embodiment shown in FIG. 2, it should be appreciated that a method of the present invention can receive a log event at different time, such as when the logging module is managing, formatting or outputting the log event. That is, the method receives a log event from management component 120, formatting component 130 or output component 140 of JLog. In an embodiment shown in FIG. 2, an example of receiving a log event from management component 120 is illustrated; and in an embodiment shown in FIG. 3, an example of receiving a log event from formatting component 130 is illustrated.

Additionally, it is to be understood when the method of the present invention has many implementations during the process of judging whether a log event meets a predetermined condition. For example, judgment may be made to each field of a log event as follows: first, one field is extracted from the log event and judgment is made as to whether the field meets a predetermined condition, then a corresponding process determined according to the predetermined condition is executed; next, judgment is made to other fields of the log event. This implementation is employed in the embodiment shown in FIG. 2. In addition, judgment may be made to each predetermined condition as follows: first, one predetermined condition is obtained and the judgment is made as to whether there is a field meeting this predetermined condition, then the corresponding process determined according to the predetermined condition is executed; next, judgment is made to other predetermined conditions. Description is given to this implementation in the embodiment shown in FIG. 3.

Furthermore, it is to be understood that the method of the present invention may have various implementations when executing a process determined according to a predetermined condition. For example, different processes may be executed in series, parallel or a combination thereof. The embodiment shown in FIG. 2 illustrates an example of serial processing, and that shown in FIG. 3 illustrates an example of parallel processing. In other embodiments of the present invention, some processes can be executed in parallel while other processes may be executed in series, so that the processes may be executed in series combined with parallel.

Hereinafter, the method for log event processing will be described in detail with reference to FIG. 2.

In step 201, an additional management function is added to management component 120 of JLog. As a result, not only all functions that have been set on management component 120 but also the additional management functions added thereto may be executed when an application invokes JLog to record a log event. In this embodiment, the additional management functions may include executing the process determined according to a predetermined condition based on the fact whether the log event meets the predetermined condition.

For example, initial settings of JLog are:

```
...
/** define the class name of a formatter class */
formatter.myHandler.className=com.ibm.log.MyFormatter
/** define the name of a log file */
file.myHandler.fileName=myLog.log
/** define the class name of a listener class
*/file.myHandler.className=com.ibm.log.MyHandler
/** the listener myHandler designates a class of formatter records */
file.myHandler.formatterName=formatter.myHandler
/** add the listener myHandler to triggered listeners of the logger
myLogger */
dmb.myLogger.listenerNames=file.myHandler
...
```

In the above settings, the first two rows of code defines the formatter settings "com.ibm.log.MyFormatter" and the name of log file "myLog.log". The management function "file.myHandler" is designated to "com.ibm.log.MyHandler". The management function "file.myHandler" is designated to a formatter class, and then the management function "file.myHandler" is added to the set of usable management functions.

By adding the following code to a configuration file of JLog, the additional management function IndicationHandler is added to management component 120 of JLog:

```
...
/** class designated by the listener IndicationHandler */
IndicationHandler.className= com.ibm.log.IndicationHandler
/** add the listener IndicationyHandler to triggered listeners of the
logger myLogger */
dmb.myLogger.listenerNames=file.myHandler IndicationHandler
...
``` wherein in the first row of code, the name of the additional management function IndicationHandler is defined as "com.ibm.log.IndicationHandler," and then the additional management function IndicationHandler is added to the set of usable management functions.

In this manner, both the original management function indicated by file.myHandler and the newly added additional management function indicated by IndicationHandler are included in management component 120. Therefore, during operation, management component 120 can execute the additional management function while executing the initially set management function.

It is to be understood that after the logging module such as JLog is upgraded or updated, its management component may comprise more functions. For example, the aforesaid additional management function may become a function comprised in the management component of updated JLog. In this manner, when there is a need to use the aforesaid additional management function, the function of the management component of updated JLog can be used directly without the need of adding an additional management function to management component 120 of JLog in step 201.

The additional management function may be either further extension of a function comprised in the management component of the logging module or a function of the management component in the updated logging module. In step 202, the log event processed by the additional management function and transferred from management component 120 is received. In this embodiment, the log event is transferred from management component 120. Since management component 120 may have a plurality of management functions, the received log event may be an original log event that has not been processed by any management functions in management component 120, such as a log event that has not been filtered and that comprises all fields, or may be a log event that has been processed by one or more management functions in management component 120, such as a log event whose fields of timestamp and log event name have been filtered out.

In step 203, a field of the log event is extracted.

This embodiment employs the following implementation: before the log event is processed, one field is extracted from the log event first, and judgment is made as to whether the field meets a predetermined condition, then the corresponding process determined according to the predetermined condition is executed; next, other fields which have not been subjected to judgment are extracted from the log event until all fields are subjected to judgment. Therefore, one field needs to be extracted from the log event before judgment is made as to whether it meets a predetermined condition.

In step 204, judgment is made as to whether the field extracted from the log event meets a predetermined condition. The predetermined condition may be either preset or defined by users themselves. That is, users may modify, add or delete preset conditions according to their own needs. Predetermined conditions and processes determined according to the predetermined conditions may be saved in a configuration file, and may be changed by modifying the configuration file. The configuration file may be an XML, javascript, pure text file etc. An example of an XML file is illustrated below:

```
...
<condition key="MSG_KEY" operator="OP_EQ"
value = "ERROR_CONN_DATABASE">
</condition>
<action type="ExecProgram">
<param id="url" value="c:/IBM/Director/bin/run.exe"/>
</action>
...
```

As is clear from this example, a process determined according to the predetermined condition MSG_KEY(keyword)=ERROR_CONN_DATABASE is ExecProgram, and the program to be executed is c:/IBM/Director/bin/run.exe.

There could be a plurality of processes associated with a predetermined condition. If it is determined a log event meets the predetermined condition, the plurality of processes may be executed in series or in parallel, for example, executed in series in one thread or executed in parallel in multiple different threads. Additionally, one process could be associated with multiple predetermined conditions and the process may be executed when one or all of the multiple predetermined conditions is/are meet. For example,

```
...
<condition key="MSG_LEVEL" operator="OP_EQ" value =
"FATAL"></condition>
<condition      key="MSG_BODY"      operator="OP_CON"
value ="connection"></condition>
<action id= "SendMailAct1" type ="SendMail">
    <param id="mail" value="zhang_jun_wei@163.com"/>
    <param id="user" value="zhang"/>
    <param id="password" value="default"/>
</action>
<action id= "SendMailAct2" type ="SendMail">
    <param id="mail" value="jason@163.com"/>
    <param id="user" value="zhang"/>
    <param id="password" value="default"/>
</action>
...
```

As is clear from this configuration file, there are two processes determined according to the first condition MSG_LEVEL (log event level)=FATAL and the second condition MSG_BODY (log event body)=connection: one is SendMailAct1 (send mail action 1), i.e. send a mail to zhang_jun_wei@163.com, and the other is SendMailAct2 (send mail action 2), i.e. send a mail to Jason@163.com. Both of these two processes can be executed in series or in parallel when the log event meets any one of the first and second conditions or both of the first and second conditions.

In this embodiment, if it is determined one field of the log event meets one predetermined condition, for example, it is determined the field of log event level in the log event is equal to the highest level 1, then the flow goes to step 205 in which one or more processes determined according to the predetermined condition are executed in series in one thread; if it is determined all of the fields of the log event do not meet any condition, then the flow goes to step 207 in which judgment is made as to whether other field has not been subjected to judgment.

In step 205, a process determined according to the predetermined condition is executed. For example, when the condition that the log event level is equal to 1 is met, a process determined according to this condition could be sending the log event to a user via mail and displaying the log event on a console. Therefore, in this embodiment, the following processes may be executed in series in one thread: sending the log event to a user via mail, displaying the log event on a console and other processes determined according to the condition.

In step 206, judgment is made as to whether other processes need to be executed. If other processes in addition to the sending of the log event to a user via mail need to be executed, then the flow goes back to step 205 in which other processes are executed; if no other processes need to be executed, then the flow goes to step 207. In this embodiment, since the processes determined according to the predetermined condition further comprise displaying the log event on a console, the flow goes from step 206 back to step 205 to execute the process of displaying the log event on a console.

In step 207, judgment is made as to whether or not other fields, such as the field of log event body, have not been subjected to judgment.

If yes, then the flow goes back to step 203. In step 203, the field of log event body is extracted from the log event, judgment is made as to whether the log event body meets a predetermined condition (e.g. abnormity occurs), and a process determined according to the predetermined condition is executed when the predetermined condition is met, such as outputting the log event to a display screen and alarming a user, or sending the log event to a user's mobile device such as mobile phone, PDA and the like.

If all fields in the log event have been subjected to judgment, then the flow ends.

FIG. 3 is a flowchart of a method for log event processing according to another embodiment of the present invention.

In step 301, original formatting settings of formatting component 130 are stored. Since formatting settings of formatting component 130 can be defined by setting a configuration file, original formatting settings are first saved in a configuration file so that they can be restored after log transaction processing.

In step 302, original formatting settings of formatting component 130 are replaced with new formatting settings.

For example, original formatting settings of JLog are

```
...
formatter.myHandler.className=com.ibm.log.MyFormatter
file.myHandler.fileName=myLog.log
file.myHandler.className=com.ibm.log.MyHandler
file.myHandler.formatterName=formatter.myHandler
dmb.myLogger.listenerNames=file.myHandler
...
```

By adding the following code to the JLog's configuration file, original formatting settings of formatting component 130 of JLog are replaced with new formatting settings IndicationFormatter:

```
...
/** change the formatter class of the logger myLogger to
IndicationFormatter */
formatter.myLogger.className=IndicationFormatter
...
```

Therefore, formatting component 130 operates according to new formatting settings. In order not to affect normal outputting according to original formatting settings, original formatting settings can be saved in the configuration file, for example, in series or parallel.

In step 303, the log event transferred from formatting component 130 is received. In this embodiment, the log event being transferred comes from formatting component 130, which could be either unformatted or formatted according to new formatting settings.

In step 304, one predetermined condition is obtained. The flow of this embodiment may comprise: obtaining one predetermined condition from the configuration file, determining whether the log event meets the predetermined condition, executing a corresponding process determined according to the predetermined condition, and obtaining from the configuration file other conditions that have not been subjected to judgment, until all conditions have been subjected to judgment. Therefore, every time determination is made as to whether one predetermined condition is met, this predetermined condition needs to be obtained from the configuration file first.

In this embodiment, the obtained condition may be, for example, "the level of log event is equal to the highest level 1."

In step 305, determination is made as to whether or not the log event meets the predetermined condition.

In this embodiment, if it is determined the field of log event level in this log event is equal to the highest level 1, then the flow goes to step 306 in which one or more processes determined according to the predetermined condition are executed; if not, then the flow goes to step 307 in which determination is made as to whether or not there are other predetermined conditions that have not been judged for this log event.

For a log even containing a plurality of fields, each field may be subjected to judgment until it is determined one field meets the condition.

In step 306, processes determined according to the predetermined condition are executed in parallel in different threads. For example, when the condition that the log event level is equal to 1 is met, processes determined according to the predetermined condition could be sending the log event to a user via mail, displaying the log event on a console or the like. Therefore, in this embodiment, the following processes can be executed in parallel in different threads: sending the log event to a user via mail, displaying the log event on a console, and executing other processes determined according to the condition.

In step 307, determination is made as to whether or not there is other predetermined condition in the configuration file that has not been subjected to judgment.

If yes, then the flow goes back to step 304. In step 304, one predetermined condition to be judged (e.g. "abnormity occurs" or "reaches the set time") is obtained from the configuration file, and then determination is made as to whether or not the field of log event body in the log event comprises "abnormity occurs." When the field of log event body meets the predetermined condition, a process determined according to the predetermined condition, such as outputting the log event to a display screen and alarming, or sending the log event to a user's mobile device such as mobile phone, PDA and the like, is executed. If the field of log event body does not comprise "abnormity occurs," then determination is made as to whether or not the timestamp of the log event is "reaches the set time." When this condition is met, the associated process, such as outputting the log event to a display screen and alarming, or sending the log event to a user's mobile device such as mobile phone, PDA and the like, is executed.

If determination has been made to all fields in the log event, then the flow ends.

In another embodiment of the present invention, a log event from output component 140 of JLog may be received. The log event received from output component 140, for example, could be a log event outputted from socket. Afterwards, determination is made as to whether or not the received log event meets a predetermined condition, and a process determined according to the predetermined condition is executed when the received log event meets the predetermined condition.

In another embodiment of the present invention, there are further comprised the steps of setting a predetermined condition and executing a process determined according to the predetermined condition. A predetermined condition and process determined according to the predetermined condition could be preset default settings. Once there are default settings for a condition and process, the method of the present invention judges the predetermined condition and executes the process determined according to the predetermined condition in default. In addition, a predetermined condition and process determined according to the predetermined condition could also be temporary settings defined by users according to their needs. That is, users may modify, add or delete preset conditions and processes according to their own needs. The processes, for example, could be executing some executable files, invoked class libraries or network invocations. It is to be understood that a predetermined condition and the process determined according to the predetermined condition could be saved in a configuration file that, for example, could be an XML, javascript, pure text file etc. The predetermined condition and the process determined according to the predetermined condition may be changed by modifying the configuration file.

Besides being implemented in a third-party plug-in of a logging system in the prior art, the method for log event processing of the present invention can be directly implemented in the logging system in the prior art by modifying the code of the logging system in the prior art. Since logging systems generally include a component for processing or managing a log event, the processing flow of the method of the present invention can be simply added to the processing or management component. FIG. 4 is a block diagram of a device 400 for log event processing according to another embodiment of the present invention. Device 400 comprises: a reception unit 410, a determination unit 420 and an execution unit 430. Device 400 may further comprise a setting unit 440.

Reception unit 410 is used for receiving a log event. Specifically, reception unit 410 may receive a log event from management component 120, formatting component 130 or output component 140 of logging module 100.

Determination unit 420 is used for determining whether or not the log event meets a predetermined condition. Determination unit 420 may obtain a field of the log event and judge whether or not the field meets a predetermined condition. Additionally, determination unit 420 may obtain a predetermined condition and judge whether or not there is a field in the log event which meets the predetermined condition.

Execution unit 430 is used for executing a process determined according to the predetermined condition. Execution unit 430 may execute a process in series, parallel or a combination thereof. Additionally, execution unit 430 may execute the process when said log event meets one or all of a plurality of predetermined conditions. Furthermore, execution unit 430 may further execute one of sending a notification to a user, alarming, and invoking executable applications.

Setting unit 440 is used for setting a predetermined condition and a process determined according to the predetermined condition. The set predetermined condition and process determined according to the predetermined process may be stored in a configuration file.

FIG. 5 is a block diagram showing a computing device capable of implementing an embodiment according to the present invention.

The computer system shown in FIG. 5 comprises a CPU (Central Processing Unit) 501, a RAM (Random Access Memory) 502, a ROM (Read Only Memory) 503, a system bus 504, a Hard Disk controller 505, a keyboard controller 506, a serial interface controller 507, a parallel interface controller 508, a display controller 509, a hard disk 510, a keyboard 511, a serial external device 512, a parallel external device 513 and a display 514. Among these components, connected to system bus 504 are CPU 501, RAM 502, ROM 503, HD controller 505, keyboard controller 506, serial interface controller 507, parallel interface controller 508 and display controller 509. Hard disk 510 is connected to HD controller 505, and keyboard 511 to keyboard controller 506, serial external device 512 to serial interface controller 507, parallel external device 513 to parallel interface controller 508, and display 514 to display controller 509.

The functions of each component in FIG. 5 are well known in the art, and the architecture shown in FIG. 5 is also conventional. This structure can not only apply in a personal computer, but also in a portable device, like Palm PC, PDA and mobile phone, etc. In various applications, some units can be added to the structure illustrated in FIG. 5, or some units in FIG. 5 can be omitted. The complete system shown in FIG. 5 is controlled by computer readable instruction generally stored as software in hard disk 510, or stored in EPROM or in other non-volatile memory. The software can also be downloaded from network (not shown in the figure). It can also be stored in hard disk 510; and the software downloaded from network can be loaded to RAM 502 and executed by CPU 501 to complete the function determined by software.

Though the computer system described in FIG. 5 can support the method according to the present invention, said computer system is only an example of a computer system. The skilled in the art can understand that many other computer system designs can also realize the embodiments of the present invention.

The present invention can also be implemented as a computer program product that can be used for example by the computer system shown in FIG. 5, which can contain the codes of the method according to the present invention. Before use, the codes can be stored in a memory of other computer system, for example, a hard disk or a removable storage device like a CD or a floppy disk, or downloaded via Internet or other computer network.

The disclosed method of the present invention can be implemented in software, hardware, or the combination of software and hardware. The hardware part can be implemented by a special logic; the software part can be stored in a memory and executed by a proper instruction execution system like a microprocessor, a PC or a mainframe.

The present invention further relates to a computer program product which contains code for receiving a log event, determining whether or not the log event meets one or more a predetermined conditions, and executing one or more a processes determined according to the predetermined conditions.

Such a computer program product may be stored in a storage carrier.

While the present invention has been described with reference to what are presently considered to be the preferred embodiments, it is to be understood that the invention is not limited to the disclosed embodiments. On the contrary, the invention is intended to cover all modifications and equivalent arrangements included within the spirit and scope of the appended claims. The scope of the following claims is to be accorded the broadcast interpretation so as to encompass all such modifications and equivalent structures and functions.

What is claimed is:

1. A device for processing a log event, comprising:
a plurality of hardware units including a reception unit; a determination unit; and an execution unit, wherein:
the reception unit operable to receive a log event from a JLog logging module when the log event is managed, formatted, or outputted;
the determination unit operable to determine whether or not the log event meets one or more predetermined conditions by obtaining a field of the log event and making judgment as to whether the field meets the predetermined conditions; and the execution unit operable to execute one or more processes, determined according to the predetermined conditions when the log event meets the predetermined conditions, of sending a notification to a user, alarming, and invoking executable applications, and a storing unit for storing, in a configuration file, the one or more predetermined conditions and the one or more processes determined according to the predetermined conditions;

wherein said log event comprises multiple fields including log event ID, keyword, timestamp, log event level, log event body, and log event name;

wherein said log event level has four levels from 1 to 4 with level 1 being highest importance and level 4 being lowest importance; and wherein determining whether or not the log event meets one or more predetermined conditions comprises:

if it is determined the field of log event level in this log event is equal to the highest level 1, the one or more processes determined according to the predetermined conditions are executed; if not, then determination is made as to whether or not there are other predetermined conditions that have not been judged for this log event.

2. The device according to claim 1, wherein the reception unit is further for receiving the log event when the log event is managed by obtaining said multiple fields of said log event.

3. The device according to claim 1, wherein the determination unit is further for obtaining a predetermined condition and making judgment as to whether there is a field in the log event which meets the predetermined condition.

4. The device according to claim 1, wherein the execution unit is further for executing the processes in series, parallel or a combination thereof.

5. The device according to claim 1, further comprising:

a setting unit operable to set the predetermined conditions and the processes determined according to the predetermined conditions.

6. A method comprising:

receiving a log event from a JLog logging module when the log event is managed, formatted or outputted, wherein said log event includes multiple fields of log event ID, keyword, timestamp, log event level, log event body, and log event name;

determining whether or not the log event meets one or more predetermined conditions by obtaining a field of the log event and making judgment as to whether the field meets the predetermined conditions;

executing one or more processes, when the log event meets the predetermined conditions, of sending a notification to a user, alarming, and invoking executable applications, wherein the one or more processes is determined according to the predetermined conditions; and storing in a configuration file the one or more predetermined conditions and processes determined according to the predetermined conditions, wherein said log event level has four levels from 1 to 4 with level 1 being highest importance and level 4 being lowest importance; and wherein determining whether or not said log event meets the one or more predetermined conditions comprises:

if it is determined the field of log event level in this log event is equal to the highest level 1, the one or more processes determined according to the predetermined conditions are executed; if not, then determination is made as to whether or not there are other predetermined conditions that have not been judged for this log event.

\* \* \* \* \*